(12) United States Patent
Chu

(10) Patent No.: US 9,488,540 B2
(45) Date of Patent: Nov. 8, 2016

(54) BAROMETER WITH MULTI-FUNCTIONS OF MEASUREMENT AND DEPRESSURIZATION

(71) Applicant: JIAO HSIUNG INDUSTRY CORP., New Taipei (TW)

(72) Inventor: Keng-Fong Chu, New Taipei (TW)

(73) Assignee: JIAO HSIUNG INDUSTRY CORP., New Taipei (TW)

( * ) Notice: Subject to any disclaimer, the term of this patent is extended or adjusted under 35 U.S.C. 154(b) by 0 days.

(21) Appl. No.: 14/624,971

(22) Filed: Feb. 18, 2015

(65) Prior Publication Data

US 2015/0323403 A1 Nov. 12, 2015

(30) Foreign Application Priority Data

May 7, 2014 (TW) .............................. 103207907 U

(51) Int. Cl.
| | |
|---|---|
| *G01L 17/00* | (2006.01) |
| *G01L 7/04* | (2006.01) |
| *G01L 7/16* | (2006.01) |
| *B60C 23/04* | (2006.01) |

(52) U.S. Cl.
CPC .................. *G01L 7/04* (2013.01); *G01L 7/166* (2013.01); *B60C 23/04* (2013.01)

(58) Field of Classification Search
CPC .................. Y10T 137/7904; Y10T 137/7922; Y10T 137/3677; Y10T 137/3662; Y10T 137/3646; Y10T 137/3693; B60C 29/068; B60C 29/064; B60C 23/04; F16K 15/20; G01L 19/00; G01L 17/00; G01L 7/04; G01L 7/166; F04B 45/06; F04B 33/00; F04B 33/005; A63B 41/12; G01M 3/3272
USPC .......... 137/226–229, 150; 73/146.8; 251/339
See application file for complete search history.

(56) References Cited

U.S. PATENT DOCUMENTS

| | | | | | |
|---|---|---|---|---|---|
| 2,849,023 | A | * | 8/1958 | Kelly ...................... | F16K 1/305 137/546 |
| 4,050,311 | A | * | 9/1977 | Leach ..................... | G01L 19/00 600/498 |
| 4,552,153 | A | * | 11/1985 | Newman ............ | A61B 5/02156 600/490 |
| 4,763,516 | A | * | 8/1988 | Greenspan .......... | B60C 23/0496 73/146.8 |
| 4,768,460 | A | * | 9/1988 | Soon-Fu ................. | G01L 17/00 116/272 |
| 5,556,258 | A | * | 9/1996 | Lange ..................... | F04B 45/06 417/440 |
| 6,783,500 | B2 | * | 8/2004 | Dromms ................ | A61B 5/022 600/490 |
| 7,024,928 | B1 | * | 4/2006 | Chen .................... | G01L 19/0092 73/146.3 |
| 7,207,225 | B2 | * | 4/2007 | Chuang ................... | G01L 17/00 73/730 |
| 7,234,356 | B2 | * | 6/2007 | Lia .......................... | G01L 19/16 73/729.2 |

(Continued)

FOREIGN PATENT DOCUMENTS

FR 2592297 A1 * 7/1987 ............. A61B 5/022

*Primary Examiner* — Craig J Price
(74) *Attorney, Agent, or Firm* — Rabin & Berdo, P.C.

(57) ABSTRACT

A barometer with multi-functions of measurement and depressurization has a body, an intake set, an exhaust set, a depressurizing set and a pressure meter. The intake set is mounted on a side of the body. The exhaust set and the depressurizing set are mounted on the body and aligning with the intake set. The pressure meter is mounted on a top surface of the body. The body has an inner channel communicating with the intake set, the exhaust set, the depressurizing set and the pressure meter. Thus, the functions of inflating, pressure measuring, depressurization and re-inflating can be accomplished by the barometer for eliminating the inconvenience of frequent installing and removing an inflation apparatus, a depressurization device and a pressure meter.

10 Claims, 8 Drawing Sheets

(56) References Cited

U.S. PATENT DOCUMENTS

| | | | | |
|---|---|---|---|---|
| 7,430,901 B2* | 10/2008 | Wu | G01L 17/00 | 73/146 |
| 7,458,270 B2* | 12/2008 | Kiefer | B60S 5/043 | 73/146 |
| 7,458,920 B2* | 12/2008 | Hallar | A63B 21/06 | 206/303 |
| 7,574,920 B2* | 8/2009 | Rutherford | B60C 23/0496 | 73/146 |
| 8,015,864 B2* | 9/2011 | Petrucelli | G01L 17/00 | 73/146.8 |
| 8,387,453 B2* | 3/2013 | Petrucelli | G01L 17/00 | 73/146 |
| 8,539,971 B2* | 9/2013 | Wang | F16K 31/52416 | 137/223 |
| 8,720,475 B2* | 5/2014 | Wu | F04B 33/00 | 137/223 |
| 9,108,474 B2* | 8/2015 | Chu | B60C 29/068 | |
| 2002/0078754 A1* | 6/2002 | Chen | G01L 17/00 | 73/715 |
| 2002/0157476 A1* | 10/2002 | Dietrich | A61B 5/03 | 73/756 |
| 2005/0102108 A1* | 5/2005 | Ramachandran | H01L 21/67103 | 702/30 |

* cited by examiner

BAROMETER WITH MULTI-FUNCTIONS OF MEASUREMENT AND DEPRESSURIZATION

BACKGROUND OF THE INVENTION

1. Field of the Invention

The present invention relates to a barometer, especially a barometer with multi-functions of measurement and depressurization, which can measure a pressure of an inflatable object during inflating and can depressurize the inflatable object when the pressure of the inflatable object exceeds the limit.

2. Description of the Prior Arts

Generally, inflatable objects such as balls, cushions and tires have airbags to store air. In an inflating process, a conventional inflation apparatus is connected directly or indirectly to the airbag of the inflatable object. The indirect connection means an inflation needle is used between the conventional inflation apparatus and the inflatable object and then the inflation apparatus is operated to inflate air into the inflatable object. After inflation of the inflatable object, the conventional inflation apparatus is removed and a pressure of the inflatable object is measured by a barometer. If the pressure of the inflatable object is sufficient, the inflating operation is finished. If the pressure of the inflatable object is still not enough, the conventional inflation apparatus continuously inflates air into the inflatable object. In addition, if the pressure of the inflatable object exceeds the limit, a depressurization device or the inflation needle is connected to the inflatable object for releasing the pressure of the inflatable object.

However, during the above-mentioned operations of inflating, measuring, discharging, and re-inflating with the conventional inflation apparatus, operations of the barometer and the inflatable object are complicated and inconvenient to users and the frequency of connecting and detaching the conventional inflation apparatus, the barometer and the inflatable object is high, and this will increase the time of inflating the inflatable object and will influence the efficiency of inflating the inflatable object.

To overcome the shortcomings, the present invention provides a barometer with multi-functions of measurement and depressurization to mitigate or obviate the aforementioned problems.

SUMMARY OF THE INVENTION

The main objective of the present invention is to provide a barometer with multi-functions of measurement and depressurization, which can measure a pressure of an inflatable object during inflating and can depressurize the inflatable object when the pressure of the inflatable object exceeds the limit.

The barometer with multi-functions of measurement and depressurization has a body, an intake set, an exhaust set, a depressurizing set and a pressure meter. The intake set is mounted on a side of the body. The body has an inner channel. The exhaust set and the depressurizing set are mounted respectively in the body. The pressure meter is mounted on a top surface of the body. The inner channel communicates with the intake set, the exhaust set, the depressurizing set and the pressure meter.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
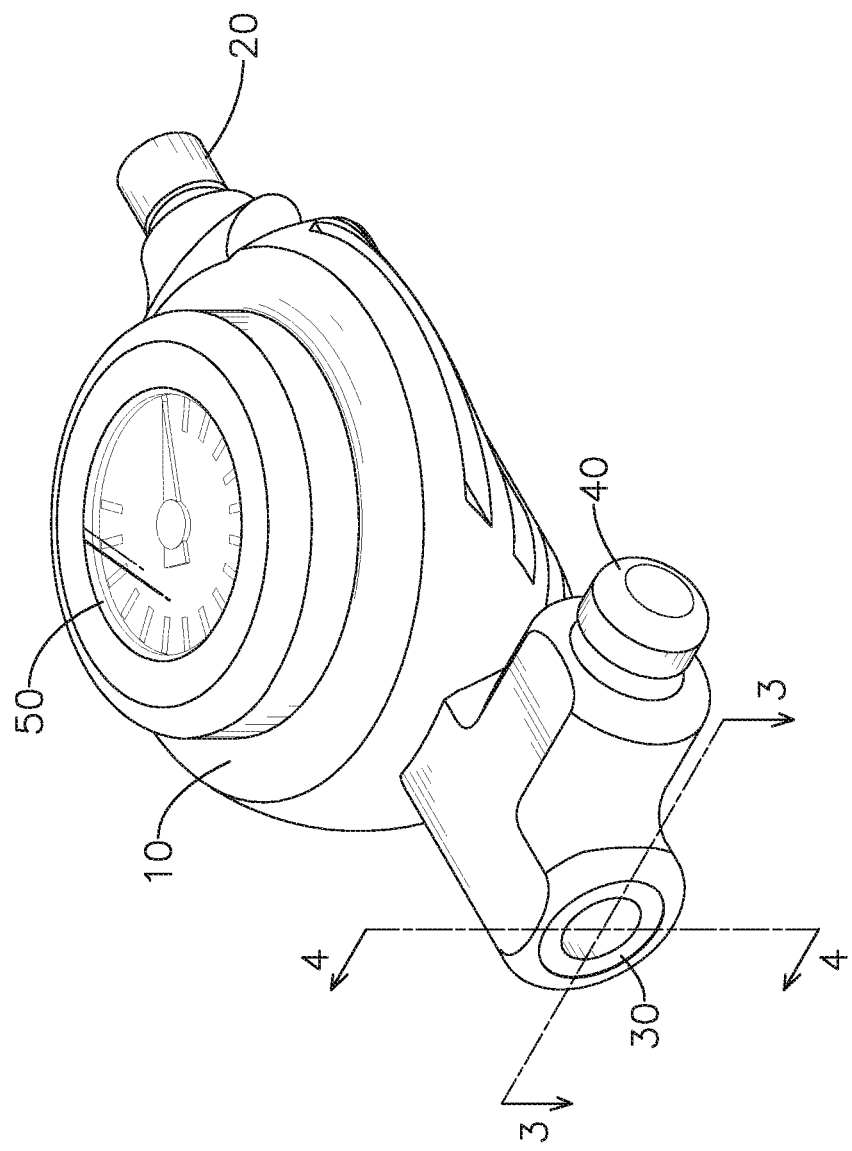
FIG. 1 is a perspective view of a first embodiment of a barometer with multi-functions of measurement and depressurization in accordance with the present invention.

With reference to FIG. 1, a first embodiment of a barometer with multi-functions of measurement and depressurization in accordance with the present invention comprises a body 10, an intake set 20, an exhaust set 30, a depressurizing set 40 and a pressure meter 50.

Figure 2:
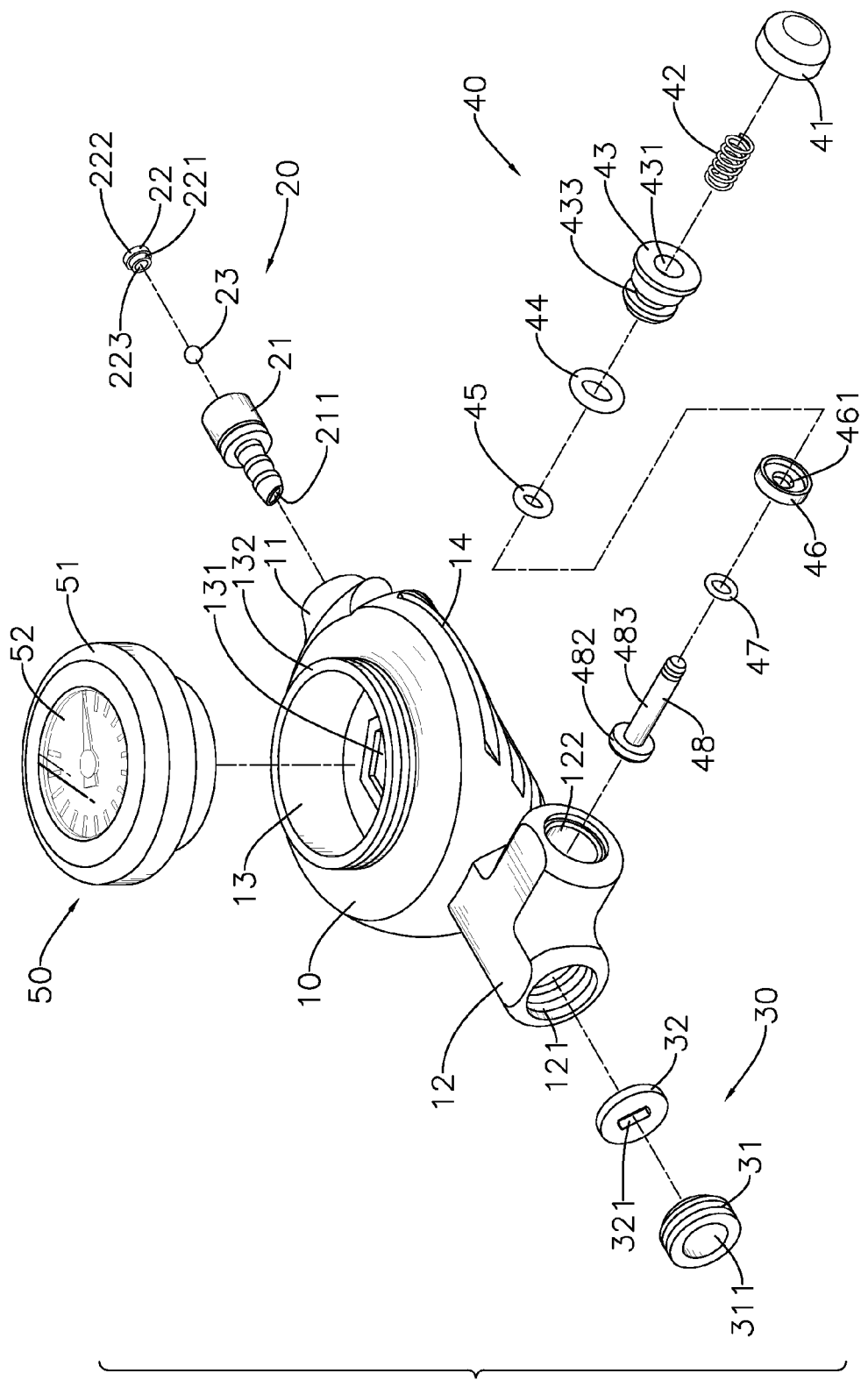
FIG. 2 is an exploded perspective view of the barometer with multi-functions of measurement and depressurization in FIG. 1.

With reference to FIGS. 1 and 2, the body 10 has a top half, a bottom half, an inflation base 11, an exhaust base 12, a meter base 13, multiple side grooves 14, and an inner channel 101. The top half of the body 10 is a hemisphere and the bottom half is an arc. The inflation base 11 is formed on and extends out of a side of the body 10. The exhaust base 12 is mounted on the body 10 and aligns with the inflation base 11. The meter base 13 is formed in a top surface of the body 10. The side grooves 14 are formed on the bottom half of the body 10 at intervals between the inflation base 11 and the exhaust base 12. The inner channel 101 is formed in the body 10.

Figure 3:
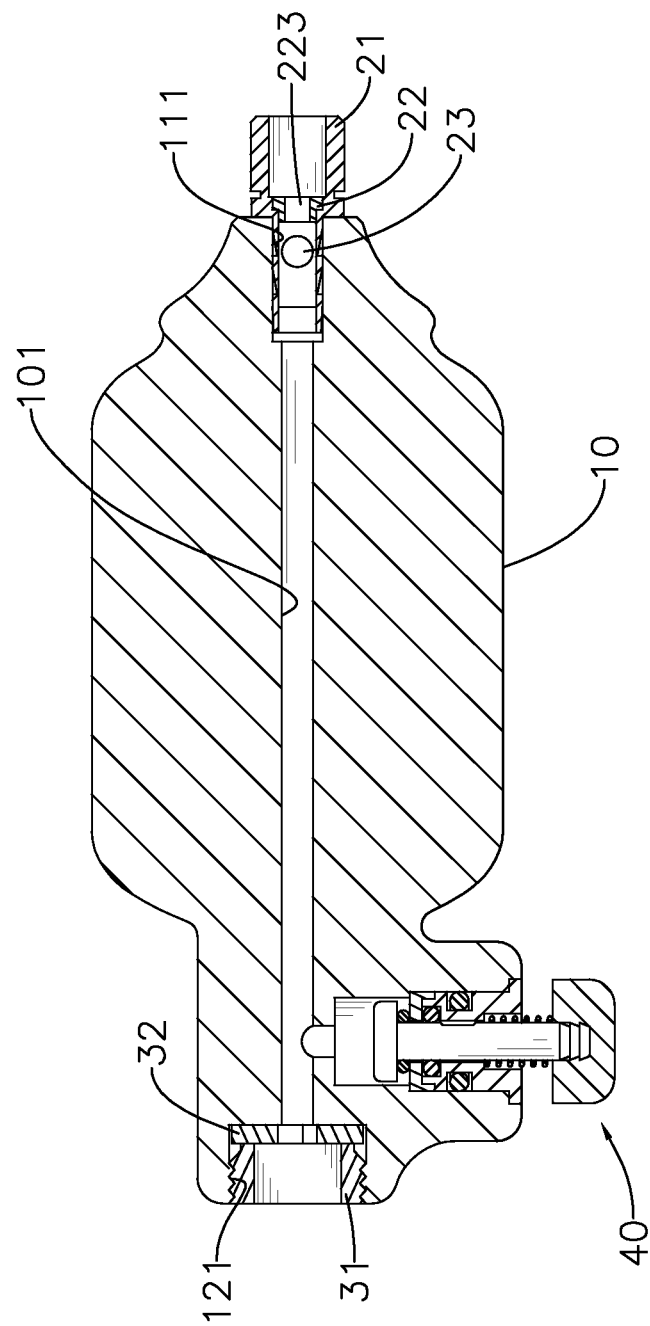
FIG. 3 is a cross-sectional side view of the barometer with multi-functions of measurement and depressurization along line 3-3 in FIG. 1.
Figure 4:
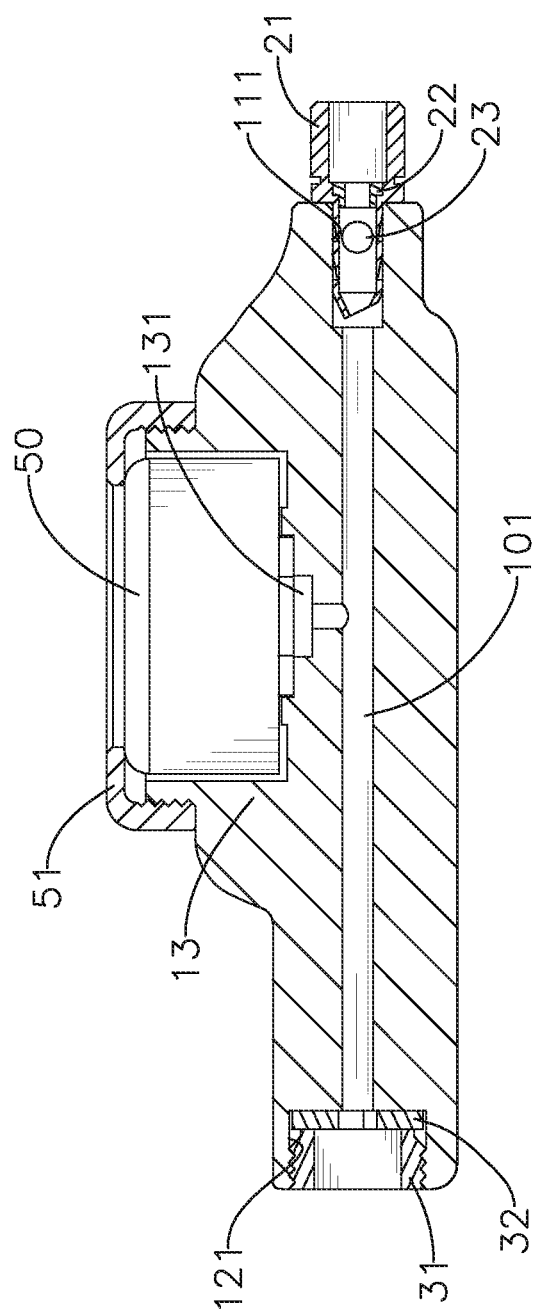
FIG. 4 is a cross-sectional side view of the barometer with multi-functions of measurement and depressurization along line 4-4 in FIG. 1.

With reference to FIGS. 2 to 4, the inflation base 11 has an inlet 111 formed in the inflation base 11 and communicating with the inner channel 101. The exhaust base 12 is connected to the body 10 and has an exhaust hole 121 and a depressurizing hole 122. The exhaust hole 121 is formed in an end of the exhaust base 12 distal from the body 10 and communicates with the inner channel 101. The depressurizing hole 122 is formed perpendicularly to the exhaust hole 121 on the exhaust base 12, and communicates with the inner channel 101. The meter base 13 has a measurement hole 131 and a linking ring 132. The measurement hole 131 is formed in a bottom surface of the meter base 13 and communicates with the inner channel 101. The linking ring 132 is formed on and protrudes from the top surface of the body 10.

The intake set 20 is connected to the inflation base 11 of the body 10 and has a connecting element 21, a limiting cap 22 and a ball 23. The connecting element 21 is mounted in the inlet 111 of the inflation base 11 and has a stepped channel 211 communicating with the inlet 111 and the inner channel 101. The stepped channel 211 has an inner part and an outer part. An inner end of the inner part of the stepped channel 211 is an oval opening. The outer part of the stepped channel 211 has an inner diameter larger than an inner diameter of the inner part of the stepped channel 211.

The limiting cap 22 is hollow, is mounted in the connecting element 21 and has a first end 221, a second end 222 and a limiting cap channel 223. The first end 221 of the limiting cap 22 is mounted in the inner part of the stepped channel 211. The second end 222 of the limiting cap 22 is formed with the first end 221 of the limiting cap 22 and has an outer diameter larger than an outer diameter of the first end 221 of the limiting cap 22. The limiting cap channel 223 is formed through the first end 221 and the second end 222 of the limiting cap 22 and communicates with the stepped channel 211 of the connecting element 21. The ball 23 is movably mounted in and is limited in the stepped channel 211 of the connecting element 21 between the limiting cap 22 and the inner end of the inner part of the stepped channel 211. When high pressure air is inflated into the connecting element 21, the ball 23 is pushed to move away from the limiting cap 22.

The exhaust set 30 is connected to the exhaust base 12 of the body 10 and has a joining element 31 and a gasket 32. The joining element 31 is mounted in the exhaust hole 121 of the exhaust base 12 and has a joining hole 311 formed through a center of the joining element 31 and communicating with the inner channel 101. The gasket 32 is connected to the exhaust base 12 in the exhaust hole 121 and abuts a side of the joining element 31. The gasket 32 has a gasket hole 321 formed through a center of the gasket 32 to communicate with the inner channel 101.

Figure 6:
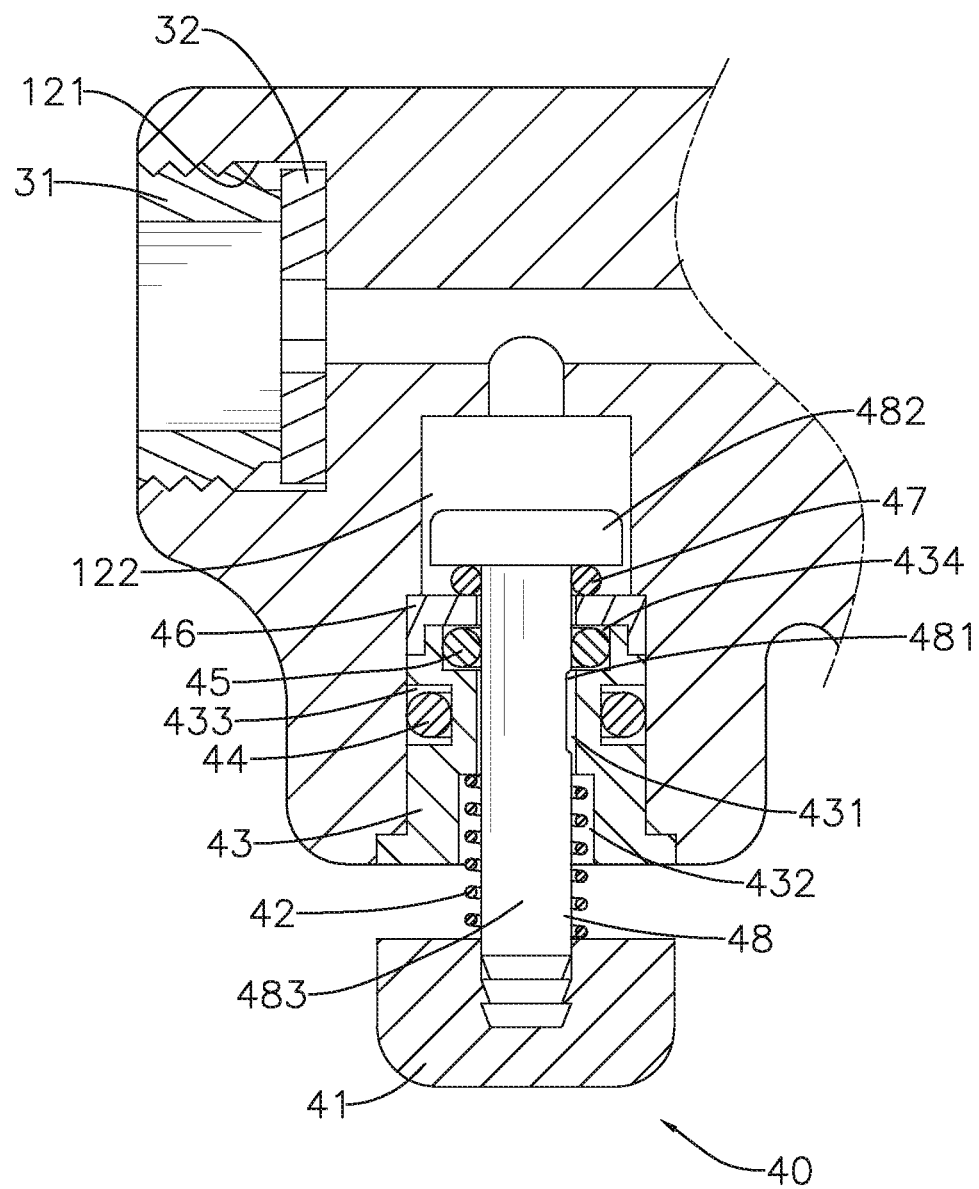
FIG. 6 is an enlarged operational side view of the barometer with multi-functions of measurement and depressurization in FIG. 1.

With the reference to FIGS. 2 and 6, the depressurizing set 40 has an installation base 43, a spring 42, a first o-ring 44, a second o-ring 45, a supporting cap 46, a push rod 48, a third o-ring 47, and a top cover 41.

The installation base 43 is connected to the exhaust base 12 of the body 10 in the depressurizing hole 122 and has a passage 431, a receiving recess 432, a first groove 433 and a second groove 434. The passage 431 is formed through a center of the installation base 43 and communicates with the depressurizing hole 122. The receiving recess 432 is formed in an inner side of the installation base 43 and communicates with the passage 431. The first groove 433 is formed on an outer surface of the installation base 43 at a middle of the installation base 43. The second groove 434 is formed in an inner surface of the installation base 43 opposite to the receiving recess 432.

The spring 42 is mounted in the receiving recess 432. The first o-ring 44 is mounted around the first groove 433. The second o-ring 45 is mounted in the second groove 434. The supporting cap 46 has a central opening 461 formed through the supporting cap 46. The supporting cap 46 is mounted around the installation base 43 to cover the second o-ring 45 and the second groove 434.

The push rod 48 is mounted through the installation base 43 and has a head portion 482, a shaft portion 483 and a depressurizing notch 481. The head portion 482 of the push rod 48 is mounted in the depressurizing hole 122 of the exhaust base 12. One end of the shaft portion 483 is mounted on a surface of the head portion 482. The depressurizing notch 481 is formed on an outer face of the shaft portion 483. The third o-ring 47 is mounted around the shaft portion 483 and abuts a surface of the head portion 482. The shaft portion 483 is mounted through the central opening 461 and the passage 431. The other end of the shaft portion 483 is mounted through the spring 42 and is connected to the top cover 41. The top cover 41 is connected to the push rod 48 and abuts the spring 42 to move outwardly relative to the exhaust base 12, so as to close the passage 431 of the installation base 43 by the third o-ring 47 as shown in FIG. 3.

With reference to FIG. 4, the pressure meter 50 is mounted in the meter base 13 and has a mounting cover 51 mounted around the linking ring 132 of the meter base 13. The mounting cover 51 is screwed on an outer wall of the linking ring 132, so the pressure meter 50 can be held in the meter base 13.

Figure 7:
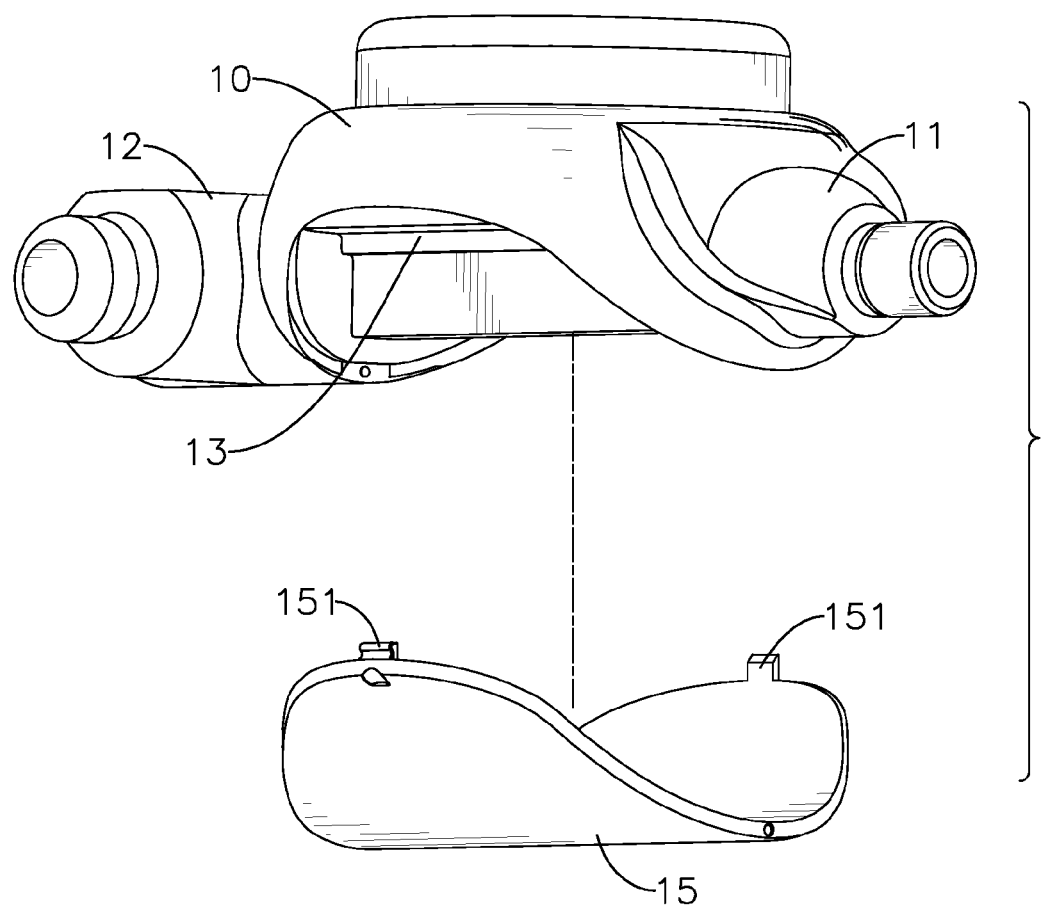
FIG. 7 is an exploded perspective view of a second embodiment of a barometer in accordance with the present invention.
Figure 8:
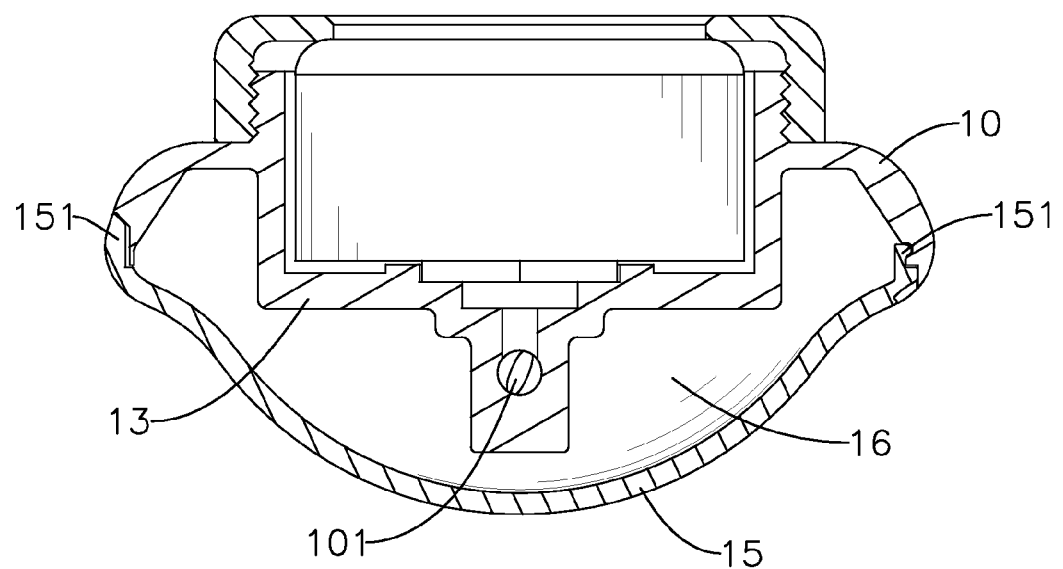
FIG. 8 is an enlarged cross-sectional side view of the barometer in FIG. 7.

With reference to FIGS. 7 and 8, a second embodiment of a barometer with multi-functions of measurement and depressurization in accordance with the present invention has a structure substantially same as that in the first embodiment except that a stepped contour is formed on the bottom half of the body 10, and the body 10 has a cover body 15 and a receiving space 16. The cover body 15 is a curved sheet and has two combining portions 151 extending respectively on two opposite ends of the cover body 15. The combining portions 151 engage the body 10. The receiving space 16 is formed in the bottom half of the body 10 and is covered by the cover body 15.

Figure 5:
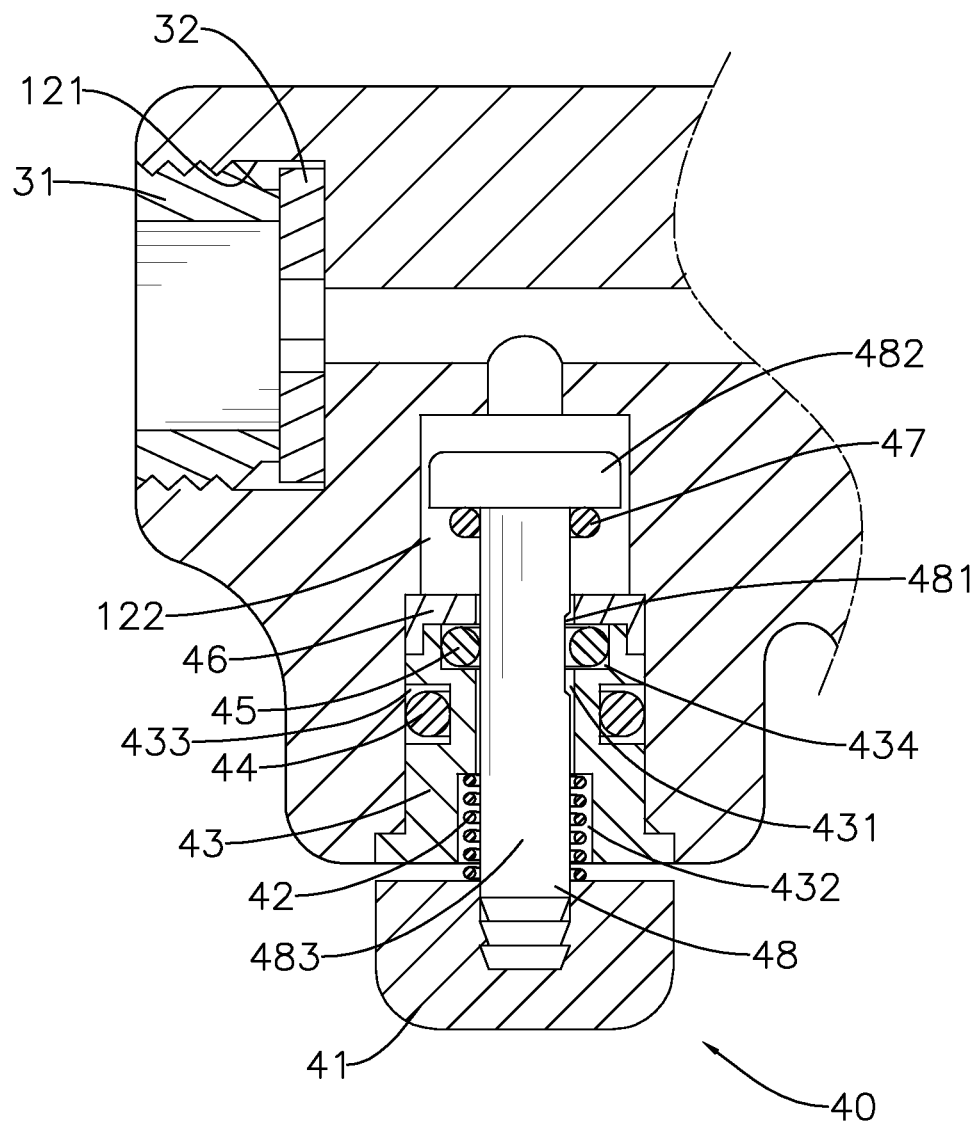
FIG. 5 is an operational side view of the barometer with multi-functions of measurement and depressurization in FIG. 1, showing the barometer pressed for depressurizing.

The inner channel 101 of the body is connected to the inlet 111, the exhaust hole 121, the depressurizing hole 122 and the measurement hole 131. For operating the present invention, an inflation apparatus is mounted into the inflation base 11 and an inflatable object is mounted directly or indirectly into the exhaust hole 121 of the exhaust base 12. In an inflating process of the inflatable object, the pressure of the inflatable object can be detected by the pressure meter 50 mounted in the meter base 13 for determining whether to continue or discontinue inflating. With reference to FIGS. 3 and 5, when the pressure value of the inflatable object exceeds the limit, the user can press the top cover 41 of the depressurizing set 40 against an elastic force of the spring 42. The push rod 48 is moved inwardly relative to the inner channel 101, such that the depressurizing notch 481 is not closed by the second o-ring 45, and the third o-ring 47 being separated from the supporting cap 46 in an open position to vent pressure from the depressurizing hole 122 past the depressuring notch 481 and into the receiving recess 432. The extra pressure in the inflatable object can be released from the depressurizing notch 481. The processes of inflating, measuring and depressurizing can be accomplished by the present invention more efficiently than the conventional technique of frequently installing and removing an inflation apparatus, a depressurization device and a pressure meter. An inflation needle can be placed in each one of the side grooves 14. In addition, the second embodiment of the present invention has the receiving space 16 formed in the bottom half of the body 10 for accommodating the inflation needle.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A barometer with multi-functions of measurement and depressurization comprising:
a body having
an inner channel;
an inflation base formed and extending on a side of the body, the inflation base having an inlet formed in the inflation base and communicating with the inner channel of the body;
an exhaust base mounted on the body, aligning with the inflation base, and having
an exhaust hole formed on one end of the exhaust base distal from the body and communicating with the inner channel; and
a depressurizing hole formed perpendicularly to the exhaust hole on the exhaust base and communicating with the inner channel;
an intake set mounted in the side of the body and communicating with the inner channel;
an exhaust set; and
a depressurizing set mounted in the body and communicating with the inner channel, and having
an installation base connected to the depressurizing hole of the exhaust base, and having
a passage formed through a center of the installation base and communicating with the depressurizing hole of the exhaust base;
a receiving recess formed in an inner side of the installation base and communicating with the passage;
a first groove formed centrally on an outer surface of the installation base; and
a second groove formed in an inner surface of the installation base opposite to the receiving recess;
a spring mounted in the receiving recess;
a first o-ring mounted around the first groove;
a second o-ring mounted in the second groove; and
a supporting cap mounted around the installation base, covering the second o-ring and the second groove, and having a central opening formed through the supporting cap;
a top cover abutted by the spring;
a push rod mounted through the installation base and having
a head portion mounted in the depressurizing hole of the exhaust base;
a shaft portion mounted through the central opening of the supporting cap and the passage of the installation base, mounted through the spring, and connecting to the top cover; and
a depressurizing notch concaved on an outer face of the shaft portion;
a third o-ring mounted around the shaft portion and abutting a surface of the head portion of the push rod, the third o-ring separating from the supporting cap in an open position to vent pressure from the depressurizing hole past the depressuring notch and into the receiving recess; and
a pressure meter mounted on a top surface of the body and communicating with the inner channel.

2. The barometer with multi-functions of measurement and depressurization as claimed in claim 1, wherein the body has
a meter base concaved on the top surface of the body, and having
a measurement hole formed in a bottom surface of the meter base and communicating with the inner channel; and
a linking ring protruding from the top surface of the body.

3. The barometer with multi-functions of measurement and depressurization as claimed in claim 2, wherein the body has
a bottom half; and
multiple side grooves concaved on the bottom half of the body at intervals between the inflation base and the exhaust base.

4. The barometer with multi-functions of measurement and depressurization as claimed in claim 3, wherein the intake set is mounted with the inflation base and has
a connecting element mounted in the inlet of the inflation base and having
a stepped channel connecting the inlet and the inner channel, the stepped channel having an inner part and an outer part, the outer part of the stepped channel having an inner diameter larger than an inner diameter of the inner part of the stepped channel, wherein an inner end of the inner part is an oval opening;
a limiting cap mounted in the stepped channel and having
a first end mounted in the inner part of the stepped channel;
a second end mounted in the outer part of the stepped channel, wherein an outer diameter of the second end is larger than an outer diameter of the first end; and
a limiting cap channel formed through the first end and the second end of the limiting cap and communicating with the stepped channel of the connecting element; and
a ball movably mounted and limited in the stepped channel of the connecting element between the limiting cap and the inner end of the inner part of the stepped channel.

5. The barometer with multi-functions of measurement and depressurization as claimed in claim 4, wherein the exhaust set is connected to the exhaust base of the body and has
a joining element mounted in the exhaust hole of the exhaust base, and having a joining hole formed through a center of the joining element and communicating with the inner channel; and
a gasket connected to the exhaust base in the exhaust hole, abutting a side of the joining element, and having a gasket hole formed through a center of the gasket and communicating with the inner channel.

6. The barometer with multi-functions of measurement and depressurization as claimed in claim 5, wherein the pressure meter is mounted in the meter base and has
a mounting cover mounted around the pressure meter and around the linking ring of the meter base, and screwed on an outer wall of the linking ring.

7. The barometer with multi-functions of measurement and depressurization as claimed in claim 2, wherein a stepped contour is formed on the body and has
a cover body being a curved sheet and having
two combining portions extending respectively on two opposite ends of the cover body and engaging the body.

8. The barometer with multi-functions of measurement and depressurization as claimed in claim 7, wherein the intake set is mounted with the inflation base and has
 a connecting element mounted in the inlet of the inflation base, and having
  a stepped channel connecting the inlet and the inner channel, the stepped channel having an inner part and an outer part, the outer part of the stepped channel having an inner diameter larger than an inner diameter of the inner part of the stepped channel, wherein an inner end of the inner part is an oval opening;
 a limiting cap mounted in the stepped channel and having
  a first end mounted in the inner part of the stepped channel;
  a second end mounted in the outer part of the stepped channel, wherein an outer diameter of the second end is larger than an outer diameter of the first end; and
  a limiting cap channel formed through the first end and the second end of the limiting cap and communicating with the stepped channel of the connecting element; and
 a ball movably mounted and limited in the stepped channel of the connecting element between the limiting cap and the inner end of the inner part of the stepped channel.

9. The barometer with multi-functions of measurement and depressurization as claimed in claim 8, wherein
 the exhaust set is connected to the exhaust base of the body, and has
  a joining element mounted in the exhaust hole of the exhaust base, and having
   a joining hole formed through a center of the joining element and communicating with the inner channel; and
  a gasket connected to the exhaust base in the exhaust hole, abutting a side of the joining element, and having a gasket hole formed through a center of the gasket and communicating with the inner channel.

10. The barometer with multi-functions of measurement and depressurization as claimed in claim 9, wherein
 the pressure meter is mounted in the meter base and has
  a mounting cover mounted around the pressure meter and around the linking ring of the meter base, and screwed on an outer wall of the linking ring.

\* \* \* \* \*